United States Patent
Gruber et al.

[11] Patent Number: 5,839,401
[45] Date of Patent: Nov. 24, 1998

[54] INTERNAL COMBUSTION ENGINE

[75] Inventors: Gerhard Gruber, Backnang; Werner Hofheinz, Plochingen; Rolf Klingmann, Plüderhausen; Johannes Schwiedessen, Esslingen, all of Germany

[73] Assignee: Daimler-Benz AG, Stuttgart, Germany

[21] Appl. No.: 874,492

[22] Filed: Jun. 12, 1997

[30] Foreign Application Priority Data

Jun. 18, 1996 [DE] Germany .................. 196 24 240.1

[51] Int. Cl.⁶ .................................................. F02B 39/02
[52] U.S. Cl. .................................. 123/90.31; 123/198 R; 123/198 C
[58] Field of Search ............... 123/90.31, 195 A, 123/198 R, 198 C

[56] References Cited

U.S. PATENT DOCUMENTS

| | | | |
|---|---|---|---|
| 3,730,147 | 5/1973 | Buchwald | 123/198 R |
| 4,502,345 | 3/1985 | Butterfield | 123/198 R |
| 5,085,199 | 2/1992 | Sado et al. | 123/198 R |
| 5,125,376 | 6/1992 | Williams et al. | 123/195 A |
| 5,189,999 | 3/1993 | Thoma | 123/198 C |
| 5,197,427 | 3/1993 | Masuda et al. | 123/198 R |
| 5,216,984 | 6/1993 | Shimano et al. | 123/41.44 |
| 5,216,989 | 6/1993 | Iwata et al. | 123/198 R |
| 5,247,914 | 9/1993 | Imai et al. | 123/90.31 |
| 5,533,475 | 7/1996 | Deane | 123/198 C |

FOREIGN PATENT DOCUMENTS

| | | |
|---|---|---|
| 2 064 016 | 6/1972 | Germany . |
| 26 28 680 | 12/1977 | Germany . |
| 39 24 912 | 2/1990 | Germany . |
| 3 534 446 | 8/1990 | Germany . |
| 40 39 206 | 6/1992 | Germany . |
| 42 06 068 | 9/1992 | Germany . |
| 43 29 284 | 3/1994 | Germany . |
| 43 09 548 | 9/1994 | Germany . |
| 43 42 802 | 6/1995 | Germany . |
| 59-087283 | 5/1984 | Japan . |
| 504 393 | 3/1939 | United Kingdom . |

*Primary Examiner*—Weilun Lo
*Attorney, Agent, or Firm*—Klaus J. Bach

[57] ABSTRACT

In an internal combustion engine including a cylinder head and at least one camshaft and accessory units comprising pumps mounted on the front end of the engine on which also drive means for the camshaft of camshafts are disposed, the accessory units are operatively coupled to the drive means for the camshafts or camshafts so as to be driven thereby.

6 Claims, 2 Drawing Sheets

INTERNAL COMBUSTION ENGINE

BACKGROUND OF THE INVENTION

The invention relates to an internal combustion engine with a cylinder head having at least one overhead camshaft and means on the front end of the engine for driving the camshaft or camshafts and with other driven accessories such as pumps arranged at the front end of the engine.

Internal combustion engines with direct fuel injection are in use as Diesel engines or as gasoline engines.

Also internal combustion engines with two camshafts are well known (see for example, DE 35 34 446 C2).

In Diesel engines, often so-called high pressure storage injection systems are employed. For the operation of such systems, a high pressure pump is required which provides the high fuel pressure required for the injection of fuel into the engine during operation. Also, another pump, a so-called fuel supply pump is provided which pumps the fuel from the fuel tank of the vehicle to the high pressure pump since the high pressure pump is generally not self-priming.

Furthermore, a vacuum pump is often required for the operation of a vehicle, particularly a vehicle with a Diesel engine in order to provide the vacuum needed for the operation of the power brakes for example. The vacuum pump is required for operating the vehicle safely since Diesel engines have no throttle valve in their intake duct so that the vacuum required for the operation of the power brakes cannot be generated in the intake duct.

However, in such arrangement comprising three pumps, that is a high pressure fuel pump, a fuel supply pump and a vacuum pump, may also be used in connection with gasoline engines with direct fuel injection systems.

A piston internal combustion engine with several pumps is known from DE 43 42 802 A1. This publication discloses an internal combustion engine which has a fuel injection pump, a fuel supply pump and an oil circulating pump attached thereto.

However, in the arrangement shown therein the pumps are arranged at different sides of the engine so that the drive arrangement for the pumps which are generally driven directly or indirectly by the engine is relatively expensive.

It is the object of the present invention to provide an internal combustion engine with several accessory units such as pumps in such a way that they can be driven in a simple and inexpensive manner.

SUMMARY OF THE INVENTION

In an internal combustion engine including a cylinder head and at least one camshaft and accessory units comprising pumps mounted on the front end of the engine on which also drive means for the camshaft or camshafts are disposed, the accessory units are operatively coupled to the drive means for the camshaft or camshafts so as to be driven thereby.

With the arrangement according to the invention, the accessory units can be driven in a simple manner for example by way of the camshaft drive which normally is used exclusively for driving the camshafts of the internal combustion engine. The accessory units may be mounted in a simple manner, directly on the engine block or an the cylinder head.

One of the accessory units, preferably a high pressure pump is preferably operable directly by way of a drive wheel which is integrated with the camshaft drive which may be a chain drive. The drive wheel for this high pressure pump would then be a chain gear whose speed relative to the engine speed can be selected by the size of the chain gear, that is the number of its teeth, for an appropriate speed of the pump shaft. Other pumps may then be driven from the camshafts by way of couplings coupling the camshafts with the pumps.

With the arrangement according to the invention all the accessory units required for the operation of a vehicle such as pumps can be driven in a simple and inexpensive manner.

Advantageous embodiments of the invention will become apparent from the following description on the basis of the schematic drawings showing the invention in principle.

DESCRIPTION OF A PREFERRED EMBODIMENT

Figure 1:
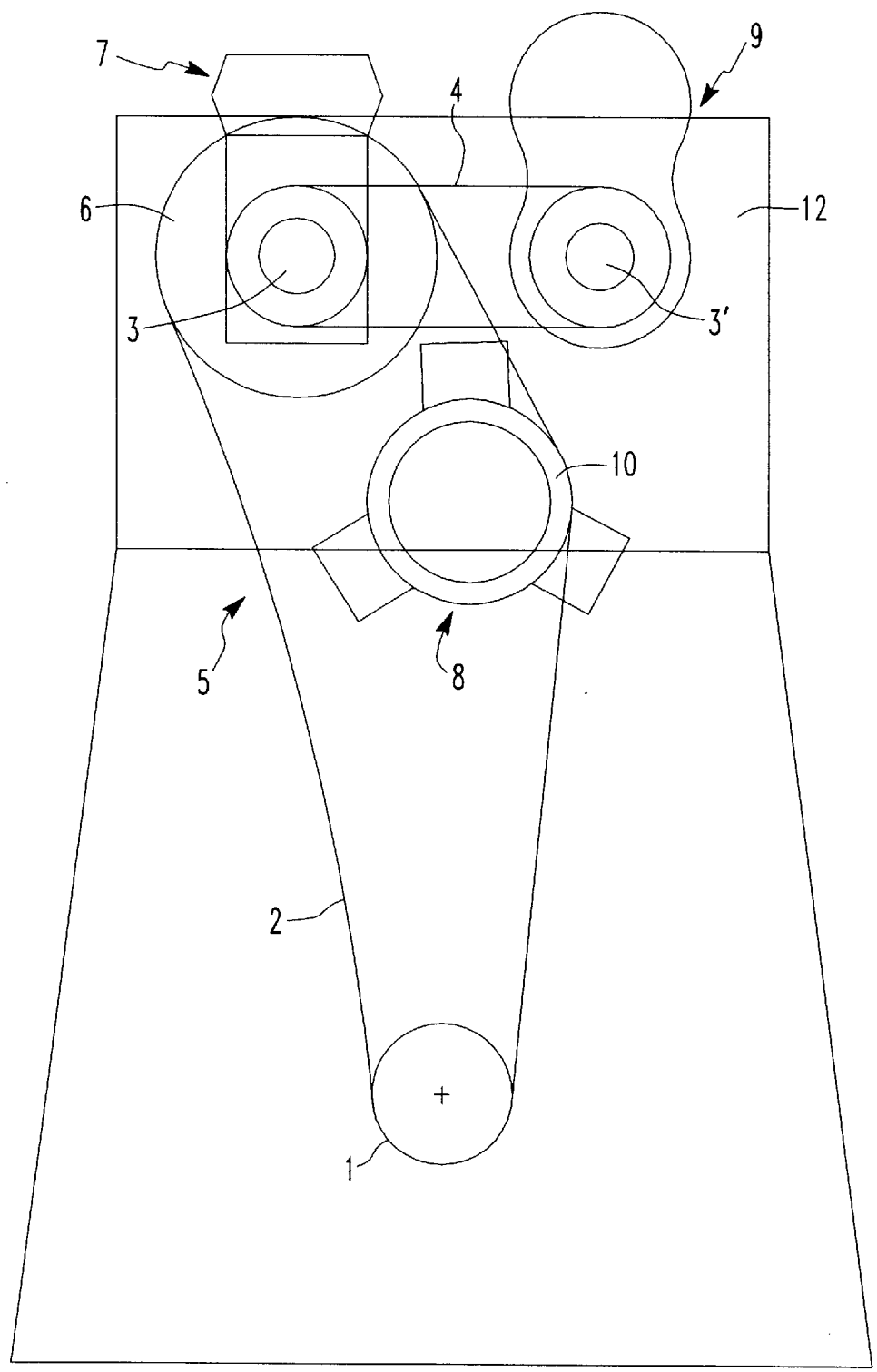
FIG. 1 is a front view of a piston internal combustion engine according to the invention.

FIG. 1 shows the front end of a piston internal combustion engine in a simplified representation. The engine includes a crankshaft which is not shown, but on which for example a chain gear 1 is mounted. A drive chain 2 extends around the chain gear 1 and around a chain gear 6 which is mounted on a first camshaft 3 for driving the camshaft 3. The camshaft 3 is operatively connected to a second cam shaft 3' by way of another chain or a toothed belt 4 or another motion transmission means so that, upon rotation of the crankshaft of the engine, also the two cam shafts 3, 3' are rotated. The transmission ratio for the camshaft drive arrangement 5 which includes the chain gear 6 on the camshaft 3 is such that the camshafts 3, 3' rotate at half the speed of the crankshaft.

The camshaft drive arrangement 5 may be a chain drive as described, a toothed belt drive or another suitable motion transmission means.

On the front end of the engine as shown in FIG. 1, there are mounted on the cylinder head 12 as auxiliary units a fuel supply pump 9 which may be for example a gear pump, and a high pressure fuel pump 8 which is preferably a piston pump. The fuel supply pump 9 and the high pressure fuel pump 8 are part of the fuel injection system of the engine as mentioned earlier.

Also mounted on the front end of the engine, on which pumps 8 and 9 are mounted, is a vacuum pump 7 which provides the vacuum required for the operation of the power brakes of the vehicle.

The three pumps 7, 8, 9 are driven by the drive arrangement 5, the drive shaft of the fuel supply pump 9 and the drive shaft of the vacuum pump 7 being disposed essentially in alignment with the camshafts 3' and 3, respectively, as described in greater detail below.

Figure 2:
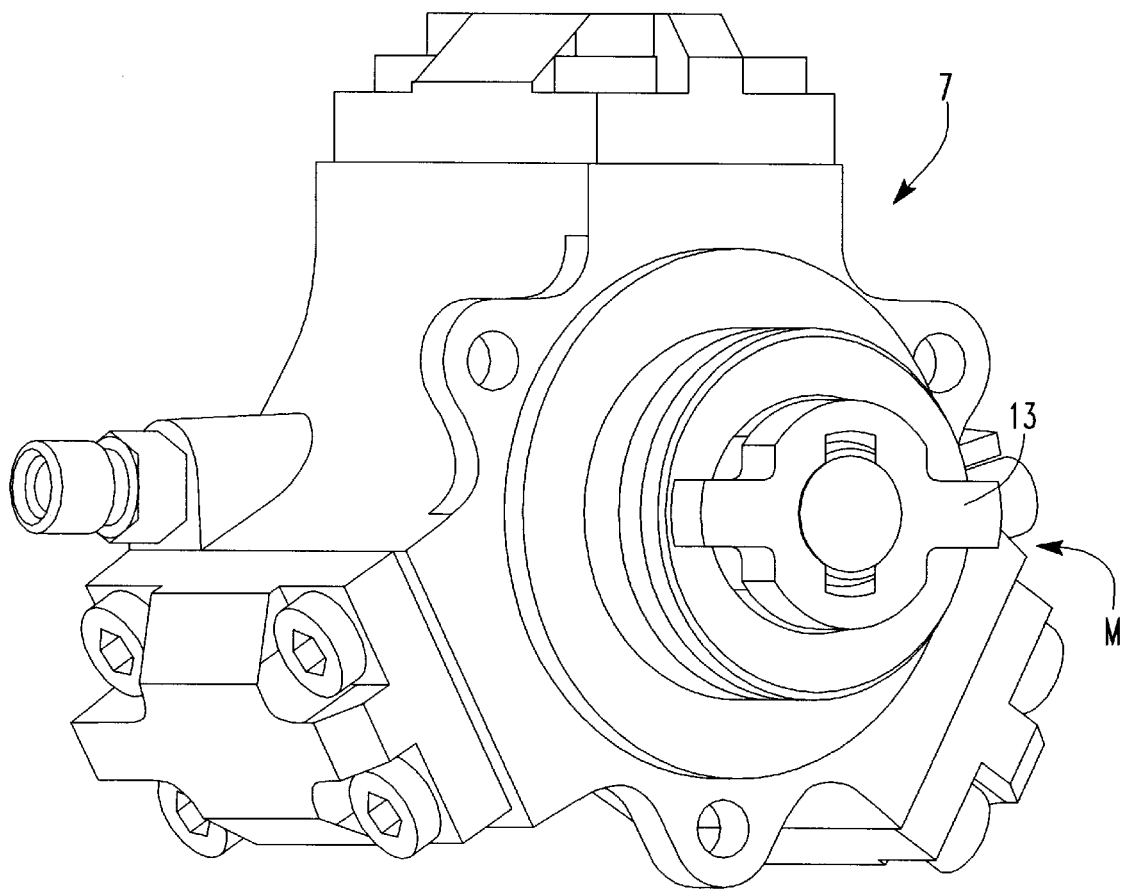
FIG. 2 is a perspective view of a pump driven by a cam shaft by means of a slide coupling member.

In order to permit mounting of the vacuum pump 7 and the fuel supply pump 9 for direct engagement with the respective camshafts 3, 3' inspite of manufacturing tolerances and mounting tolerances which may result in slight misalignments, the pumps 7, 9 are connected to the respective camshafts 3, 3' by way of slide couplings 11 shown in greater detail in FIG. 2. The slide couplings overcome possible small misalignments in the millimeter range in a simple manner.

The high pressure pump 8 is directly driven by the chain 2 of the camshaft drive arrangement 5 by way of a drive gear 10 which is mounted on the shaft of the high pressure pump 8 and which is engaged by the chain 2. In contrast to the given speed of the pump shafts of the vacuum pump and the fuel supply pump 9 which corresponds to the speed of the camshafts and consequently, half the crank shaft speed, the speed of the high pressure pump 8 may be chosen to be different by an appropriate selection of the diameter of its drive gear 10 that is, respectively, its number of teeth. With the selection of the diameter of the drive gear 10 and consequently the relative speed of the shaft of the high pressure pump 8 the pressure and the pumping volume of the pump may be selected so that the same pump may be adapted for use with different internal combustion engines and for different applications.

Consequently, a single pump type may be used in connection with different engines since the pump performance can be adapted to the engine requirements simply by selection of a drive gear 10 with a suitable diameter.

Slide member couplings 11 as shown partially in FIG. 2 are known in practice also under the designation cross-disc couplings. As they are known in various applications, they are not described in detail as to their design and advantages.

FIG. 2 shows the slide member 13 of such a coupling merely for an explanation of the operation. The slide member 13 includes a slot in which an engagement structure of the pump shaft is received. If the slide member 13 is rotated and the input and output shafts of the slide member coupling are not in exact alignment, the slide member 13 will accommodate any shaft misalignment by corresponding compensation movements.

The chain gear 10 of the high pressure pump 8 is firmly mounted on the shaft of the high pressure pump 8—in contrast to the drive wheels for the fuel supply pump 9 and the vacuum pump 7 which are mounted on the respective camshafts 3', 3. The fuel supply pump 9 and the vacuum pump 7 are mounted to the cylinder head of the internal combustion engine as well as possible in alignment with the respective camshafts 3', 3. Motion is transmitted from the camshafts 3', 3 to the shafts of the fuel supply pump 9 and the vacuum pump 7 by way of the cross-disc type couplings 11 referred to above, that is the ends of the camshafts 3, 3' form the driving parts for the respective cross-type couplings with the vacuum and fuel supply pump shafts.

The drive gear 10 for the high pressure pump 8 however may be supported by a separate support structure (not shown) on the cylinder head of the internal combustion engine and the drive for the high pressure fuel pump 8 may also include a cross-disc type coupling. With the arrangement as described, several pumps of an internal combustion engine may be associated with the camshaft drive means in a simple and efficient manner.

What is claimed is:

1. An internal combustion engine having a front end and including a cylinder head and two camshafts and accessory units including a fuel supply pump, a high pressure fuel pump and a vacuum pump for a power brake system mounted on the front end of said engine, and drive means disposed on the front end of said engine for driving said camshafts, one of said camshafts being directly coupled to said drive means, the other camshaft being driven from said one camshaft by way of a chain or toothed belt drive, two of said pumps being coupled each to one of said camshafts so as to be driven by the drive means for said camshafts and the third pump having a drive wheel in engagement with said drive means to be directly driven thereby.

2. An internal combustion engine according to claim 1, wherein said third pump is said high pressure fuel pump.

3. An internal combustion engine according to claim 1, wherein said accessory units are coupled to said camshafts by cross-disc type couplings disposed on the ends of said camshafts.

4. An internal combustion engine according to claim 1, wherein said camshafts have, adjacent said accessory units, end portions which are received in, and form part of, said cross-disc type couplings with said accessory units.

5. An internal combustion engine according to claim 1, wherein the drive wheel for said third pump is rotatably supported on said cylinder head.

6. An internal combustion engine according to claim 4, wherein said high pressure fuel pump has a drive wheel which is exchangeable for adaptation of the pump speed to the requirements of the engine with which the high pressure fuel pump is used.

\* \* \* \* \*